United States Patent
Patel et al.

(10) Patent No.: US 12,107,936 B2
(45) Date of Patent: Oct. 1, 2024

(54) CENTRALIZED SUBSCRIPTION-BASED ENTERPRISE NOTIFICATION SYSTEM

(71) Applicant: Capital One Services, LLC, McLean, VA (US)

(72) Inventors: Milind Patel, Frisco, TX (US); Samin Bohara, Fate, TX (US); Briana Vargas, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/088,966

(22) Filed: Dec. 27, 2022

(65) Prior Publication Data

US 2024/0214465 A1 Jun. 27, 2024

(51) Int. Cl.
*H04L 67/55* (2022.01)

(52) U.S. Cl.
CPC .................. *H04L 67/55* (2022.05)

(58) Field of Classification Search
CPC ...................................... H04L 67/55
See application file for complete search history.

(56) References Cited

U.S. PATENT DOCUMENTS

| | | | | |
|---|---|---|---|---|
| 6,671,355 B1 * | 12/2003 | Spielman | ................... | H04L 9/40 370/356 |
| 7,092,497 B1 * | 8/2006 | Spielman | ................. | H04L 67/30 379/88.13 |
| 2002/0120697 A1 * | 8/2002 | Generous | .................. | H04L 9/40 709/206 |
| 2006/0080656 A1 * | 4/2006 | Cain | ......................... | G06F 8/65 434/118 |
| 2013/0208672 A1 * | 8/2013 | Papasakellariou | .... | H04W 72/54 370/329 |
| 2015/0074191 A1 * | 3/2015 | Feng | ....................... | H04L 67/55 709/204 |
| 2016/0014837 A1 * | 1/2016 | Seo | ....................... | H04W 76/18 370/329 |
| 2017/0118303 A1 * | 4/2017 | Ratiu | ....................... | H04L 67/02 |
| 2017/0118304 A1 * | 4/2017 | Ratiu | ....................... | H04L 67/01 |
| 2019/0215289 A1 * | 7/2019 | Raskar | ................... | H04L 51/224 |
| 2021/0336949 A1 * | 10/2021 | Kohli | ....................... | H04L 63/18 |

\* cited by examiner

*Primary Examiner* — Jeong S Park
(74) *Attorney, Agent, or Firm* — KDW Firm PLLC (57) ABSTRACT

A method, an apparatus, and a computer program product for subscription-based notifications of events in enterprise systems. A plurality of notification message delivery channels for delivery of one or more notification messages to one or more user devices is identified. The notification messages are received from one or more software applications and correspond to one or more events associated with the software applications. A first notification message delivery channel is selected from the plurality of notification message delivery channels for delivery of the received notification messages based on one or more subscriptions associated with the user devices to the events. The subscriptions are configured using one or more subscription preferences received from the user devices. The received notification messages are transmitted to the user devices using the selected first notification message delivery channel.

20 Claims, 5 Drawing Sheets

202 — Identify a plurality of notification message delivery channels for delivery of one or more notification messages to one or more user devices 204 — Select, based on one or more subscriptions associated with one or more user devices to one or more events, a first notification message delivery channel from the plurality of notification message delivery channels for delivery of the received notification messages 206 — Transmit the received notification messages to one or more user devices using the selected first notification message delivery channel

CENTRALIZED SUBSCRIPTION-BASED ENTERPRISE NOTIFICATION SYSTEM

TECHNICAL FIELD

This disclosure relates generally to data processing and, in particular, to subscription-based notifications of events in enterprise systems.

BACKGROUND

Enterprise computing systems provide an ability to manage and execute various computing processes that may be associated with one or more software applications integrated into and/or with the enterprise computing systems. Software applications generate notifications to notify its users of various events that may be occurring during execution of processes associated with the software applications. Currently, each software application has separate notification functions to which users individually subscribe in order to receive notifications of such events. Notifications are typically transmitted through various channels (e.g., email, voice, etc.). A lack of a centralized subscription-based notification capability for all software applications in an enterprise computing system complicates generation and/or transmission of timely notifications, requires separate provisions (e.g., licenses) for different types of notification channels, increases memory consumption and costs associated with management of notifications, and creates an environment that is prone to errors in delivering timely notifications to users.

SUMMARY

In some implementations, the current subject matter relates to a computer implemented method for generation and/or transmission of subscription-based notifications. The method may include identifying, using at least one processor, a plurality of notification message delivery channels for delivery of one or more notification messages to one or more user devices. One or more notification messages may be received from one or more software applications and may correspond to one or more events associated with one or more software applications. The method may include selecting, based on one or more subscriptions associated with one or more user devices to one or more events, a first notification message delivery channel from the plurality of notification message delivery channels for delivery of the received notification messages. One or more subscriptions may be configured using one or more subscription preferences received from one or more user devices. The method may further include transmitting received one or more notification messages to one or more user devices using the selected first notification message delivery channel.

In some implementations, the current subject matter may include one or more of the following optional features. The selecting may include determining a type in a plurality of types of the received one or more notification messages, and selecting the first notification message delivery channel based on the one or more subscriptions and the type of the received one or more notification messages. The type of the received notification messages may include at least one of the following: an email message, a short-message-service (SMS) message, an audio message, a video message, a text message, a voice message, a push notification message, and any combination thereof. Each type in the plurality of types may be associated with one or more notification message delivery channels in the plurality of notification message delivery channels. In some implementations, the method may also include determining a failure to deliver the received one or more notification messages using the selected first notification message delivery channel, selecting a second notification message delivery channel in one or more notification message delivery channels based on one or more subscriptions and the type of received one or more notification messages, and transmitting received one or more notification messages using the selected second notification message delivery channel.

In some implementations, one or more subscription preferences received from one or more user devices may be configured using a list of subscribable events associated with one or more software applications.

In some implementations, the selecting may include selecting the first notification message delivery channel for delivery of received one or more notification messages based on one or more subscriptions and a content of received one or more notification messages.

In some implementations, the selecting may include extracting a subscription identifier associated with received one or more notification messages and selecting the first notification message delivery channel for delivery of received one or more notification messages based on one or more subscriptions and the extracted subscription identifier. The subscription identifier may identify at least one of the following: one or more user devices, one or more events, one or more software applications, one or more subscription preferences, and any combination thereof.

In some implementations, the method may also include generating one or more scores for each notification message delivery channel in the plurality of notification message delivery channels in accordance with at least one of: a successful delivery of received one or more notification messages, a failed delivery of received one or more notification messages, and any combination thereof. The selecting may also include selecting the first notification message delivery channel for delivery of received one or more notification messages based on one or more subscriptions and one or more generated scores. The successful delivery of received one or more notification messages may be determined based on an acknowledgement received from one or more user devices. The failed delivery of received one or more notification messages may be determined based on a failure to receive an acknowledgement from one or more user devices. Each notification message delivery channel in the plurality of notification message delivery channels may be associated with one or more service providers in a plurality of service providers configured for delivery of received one or more notification messages. The method may also include storing generated one or more scores in a storage location.

In some implementations, the current subject matter relates to an apparatus for generation and/or transmission of subscription-based notifications. The apparatus may include at least one processor, and at least one non-transitory storage media that may store instructions that, when executed by at least one processor, cause at least one processor to perform the following operations. The operations may include configuring one or more subscriptions using one or more subscription preferences received from one or more user devices. One or more subscriptions may be associated with one or more events associated with one or more software applications. The operations may further include receiving one or more notification messages corresponding to one or more events from one or more software applications, identifying a plurality of notification message delivery channels for delivery of one or more notification messages to one or more user devices, selecting, based on one or more subscriptions, a first notification message delivery channel from the plurality of notification message delivery channels for delivery of received one or more notification messages, and transmitting received one or more notification messages to one or more user devices using the selected first notification message delivery channel.

In some implementations, the current subject matter may include one or more of the following optional features. The first notification message delivery channel may be selected based on one or more subscriptions and a type of received one or more notification messages. The type of received one or more notification messages may include at least one of the following: an email message, a short-message-service (SMS) message, an audio message, a video message, a text message, a voice message, a push notification message, and any combination thereof. Further, the type of received one or more notification messages may be associated with one or more notification message delivery channels in the plurality of notification message delivery channels.

In some implementations, the operations may further include determining a failure to deliver received one or more notification messages using the selected first notification message delivery channel, selecting a second notification message delivery channel in one or more notification message delivery channels based on one or more subscriptions and the type of the received one or more notification messages, and transmitting the received one or more notification messages using the selected second notification message delivery channel.

In some implementations, the current subject matter relates to non-transitory storage media storing instructions that, when executed by at least one processor, cause at least one processor to perform the following operations. The operations may include receiving one or more notification messages corresponding to one or more events from one or more software applications, identifying a plurality of notification message delivery channels for delivery of one or more notification messages to one or more user devices, selecting a first notification message delivery channel from the plurality of notification message delivery channels for delivery of received one or more notification messages, transmitting received one or more notification messages to one or more user devices using the selected first notification message delivery channel, determining a failure to deliver the received one or more notification messages using the selected first notification message delivery channel, selecting a second notification message delivery channel in one or more notification message delivery channels based on a type of received one or more notification messages, and transmitting received one or more notification messages using the selected second notification message delivery channel.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

To address these and potentially other deficiencies of currently available solutions, one or more implementations of the current subject matter relate to methods, systems, articles of manufacture, and the like that can, among other possible advantages, provide centralized subscription-based event notifications in enterprise systems.

In some implementations, the current subject matter generally relates to a centralized notification system that provides subscription-based notifications of events encountered and/or generated by one or more software/client applications. Currently, each software application requires its users to separately subscribe to receive notifications of application's events. Applications must also obtain separate licenses for different service providers for each notification message type (e.g., email, SMS, push, etc.), manage different subscription types, process message delivery failures, and handle other issues, which significantly increases operational costs, latency, unnecessary data storage, etc. The current subject matter provides an ability to centrally manage notification messages receipt from software applications and their delivery to end user devices. The management involves configuration of subscription preferences, selection of appropriate delivery channels, and use of machine learning/scoring to select "best" available delivery channels in view of historical message delivery data for each delivery channel under management.

In some implementations, the current subject matter's centralized subscription-based notification system may be configured as a highly available, multi-cloud, smart communication computing system that may be specially programmed to fulfill message requests at an enterprise level. The notifications generated by the current subject matter's notification system may correspond to one or more events associated with one or more software applications. Such software applications may be used by one or more users, whereby users may wish to be notified of such events. Events may include for example, but not limited to, upgrades/updates to software applications (e.g., new versions, bug fixes, availability of optional upgrades, etc.), availability of new data from software applications, compatibility issues, etc. Software applications may be configured to operate in, be integrated with, and/or otherwise be compatible with the enterprise system that users may use and/or may have access to for the purposes of performing various functions (e.g., application development, data management, etc.). The software applications may be native to the enterprise system and/or be third party applications operating outside of the enterprise system and communicatively coupled to it (e.g., with appropriate permissions).

In some example implementations, the current subject matter may be configured to use one or more machine learning algorithms to determine one or more optimal channels (e.g., email channel, short message service (SMS) channel, text message channel, voice communication channel, push notification channel, etc.) for delivery of notification messages from software applications to users. Such optimal paths may be based on messaging service provider's availability, usage cost, performance, and/or any other factors and/or any combination of factors. Moreover, the current subject matter may be configured to provide one or more customizable subscriptions capabilities, whereby software applications may integrate and/or configure one or more subscription options. Such subscription options may be indicative of specific types of channels (e.g., email, SMS, etc.) and/or specific channels within a particular channel type that should be used for delivery of notifications, frequency of delivery of notifications, types of notifications to be delivered, etc.

In some example implementations, the current subject matter may further be configured to allow users of one or more software applications in the enterprise system to opt-in and/or opt-out of receiving notifications corresponding to various events associated with the software applications. Users may interact with the system to track notification message history, perform real-time communication, view enterprise-wide messaging cost(s), performance metric(s), and/or any other information related to notification message delivery.

As such, the current subject matter's centralized enterprise-based notification subscription system may be advantageous in accelerating development and/or release of new software applications and/or features that may provide and/or require subscription-based notifications, where such notifications are centrally, as opposed to individually, subscribed to, managed, and delivered from one location. Moreover, the current subject matter, by virtue of providing a standardized enterprise solution for subscription-based communication, reduces an amount of development and/or incorporation of complicated logic into software applications for the purposes of providing event notifications. This, in turn, reduces operational costs and maintenance overhead for software applications. Additionally, implementation of notification and subscription features may be performed in a fraction of the time without requiring additional maintenance. Also, the current subject matter may also reduce a number of licenses that may be required for providing notification via various channels (e.g., email, SMS, etc.) and/or notification message type. A single license may be obtained from each vendor for providing notifications to users.

Figure 1:
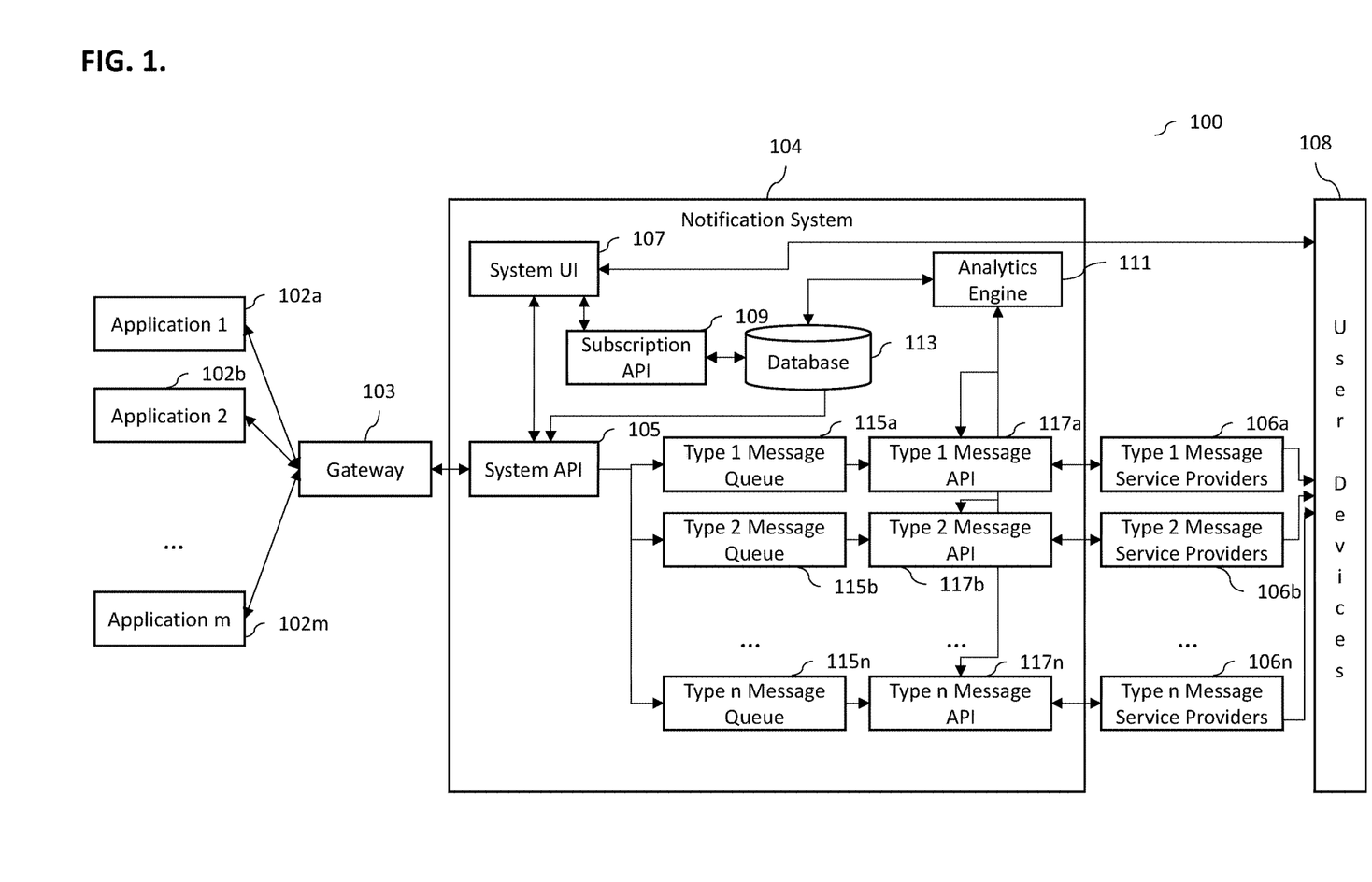
FIG. 1 illustrates an exemplary event notification system, according to some implementations of the current subject matter.

In some implementations, the current subject matter may be configured to reduce an amount of storage consumed by each application in connection with providing notification features (e.g., in conventional systems, large amounts of user contact and notification data may need to be stored). Using the current subject matter's techniques, all user data regarding messaging history, user subscriptions, and/or user contact information (e.g., phone numbers, device tokens, email addresses, etc.) may be stored and maintained using a system (e.g., system 100 as shown in FIG. 1). This may reduce storage cost and/or remove a need for storing and maintaining duplicate sensitive data.

Further, the current subject matter may be configured to handle various failures associated with delivery (and/or failure thereof) of notification messages. In particular, the current subject matter may be configured to identify and handle such failures through automatic retries across multiple providers of messaging channels. When an initial request to a messaging provider occurs, the current subject matter may be configured to determine whether such messaging provider has previously failed to deliver message(s) and if so, retry using a separate provider. The incoming messages may then be routed away from the failing provider (e.g., for a predetermined period of time), thereby ensuring successful delivery of every notification.

In some implementations, the current subject matter notification system may be implemented as a multi-cloud solution, which may further ensure that the notification system is highly available and reliable. Additionally, the notification system may be configured to reduce processing risks by allowing software application to make a single request to the notification system to provide a centralized, predictable solution for multiple notification methods instead of the software application having to build multiple requests for multiple solution providers. Moreover, the notification system may be modular and scalable to allow for integration of other notification types.

In some example implementations, the current subject matter may be configured to include a subscription engine and/or a notification system (used interchangeably herewith) that may identify a plurality of notification message delivery channels (e.g., messaging provider 1 email channel, messaging provider 1 SMS channel, messaging provider 2 voice channel, etc.) for delivery of one or more notification messages to one or more user devices. The notification message may be received from one or more software applications and may correspond to one or more events generated by the software applications. The user devices may be subscribed to receive such notifications from software applications. Subscriptions may vary on a per-user device and/or a per-software application bases, e.g., one user device may be subscribed to receive notification for all events generated by software application(s), while another user device may be subscribed to receive notification for only critical events generated by software application(s) (e.g., notification relating to critical updates).

The notification system may be configured to select based on one or more user- and/or software application-configurable parameters associated with subscriptions to one or more events, a notification message delivery channel for delivery of the received notification message(s). Selections of delivery channels may be based on a particular selection priority of channels, channel providers (e.g., telecommunications providers, internet service providers, etc.), etc. For example, the selected notification message delivery channel may be a specific channel (e.g., provider1/email channel) to deliver the notification message. The channel may be selected from a plurality of notification message delivery channels that may be available to the user device(s) and/or software application(s) for delivery of messages. For example, one provider may have several email channels, several SMS channels, etc. The subscriptions may be configured using one or more subscription preferences. Such preferences may be received from each user device that wishes to receive notifications of events.

Alternatively, or in addition, selection of channels may be based on data associated with prior delivery of notifications and/or failures to deliver such notifications. The notification system may be configured to include various machine learning capabilities (e.g., neural networks, convoluted neural networks, etc.) that may allow the current subject matter to select a specific channel based on, for example, availability of channels, prior delivery history associated with each channel, user preferences, provider availability, costs associated with each channel, delivery statistics (e.g., time to deliver a message, transmission rate, etc.), and/or any other factors.

In some implementations, the notification preferences may also be configured by the software applications, e.g., a software application may prevent certain users from receiving notifications relating to some of its events. Additionally, as stated above, the notification system may also include machine learning capabilities whereby it may determine subscription preferences and update them based on a learned behavior of user devices and/or software applications.

Once a particular channel(s) is selected by the notification system, the system may be configured to transmit and/or deliver (used interchangeably herewith) the received notification messages to the appropriate user devices. The messages are transmitted using the selected notification message delivery channel.

FIG. 1 illustrates an exemplary event notification system 100, according to some implementations of the current subject matter. The system 100 may include one or more software applications 1, 2, . . . , m 102 ($a, b, \ldots, m$), a notification system 104, one or more notification message providers 106 ($a, b, \ldots, n$), and one or more user devices 108 (shown as a single element in FIG. 1 for ease of illustration, but as can be understood, there may be single or multiple user devices). The applications 102 may be communicatively coupled to the notification system 104 using one or more gateways 103 that may provide communication capabilities for transmissions of notifications of events generated by the software applications 102 to the notification system 104.

As shown in FIG. 1, components 102-108 may be communicatively coupled using one or more communications networks. The communications networks may include one or more of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and/or any combination thereof.

Further, components 102-108 may include any combination of hardware and/or software. In some implementations, components 102-108 may be disposed on one or more computing devices, such as, server(s), database(s), personal computer(s), laptop(s), cellular telephone(s), smartphone(s), tablet computer(s), and/or any other computing devices and/or any combination thereof. In some example implementations, components 102-108 may be disposed on a single computing device and/or may be part of a single communications network. Alternatively, or in addition to, such components may be separately located from one another. A component may be a computing processor, a memory, a software functionality, a routine, a procedure, a call, and/or any combination thereof that may be configured to execute a particular function associated with the notification system 104.

The notification system 104 may include one or more of the following computing components: a system application programming interface (API) 105, a system user interface (UI) 107, a subscription API 109, an analytics engine 111, a database 113, one or more message (type-based) queue components 115 ($a, b, \ldots n$), and one or more message (type-based) message API components 117 ($a, b, \ldots, n$). Similar to the above, components 105-117 may be communicatively coupled using one or more communications networks that may include one or more of the following: a wired network, a wireless network, MAN, LAN, WAN, VLAN, an internet, an extranet, an intranet, and/or any other type of network and/or any combination thereof. Each component may also be any combination of hardware and/or software.

The system API 105 may be communicatively coupled to the gateway 103 as well as the system UI 107, the database 113 and one or more message queue components 115. Each message queue component 115 may be communicatively coupled to a corresponding message API component 117 (e.g., message queue component 115$a$ may be communicatively coupled to the message API component 117$a$, message queue component 115$b$ may be communicatively coupled to the message API component 117$b$, etc.). The system UI 107 may be communicatively coupled to the subscription API 109, which, in turn, may be communicatively coupled to the database 113. The system UI 107 may also be coupled to one or more user devices 108. The database 113 may be communicatively coupled to the analytics engine 111, which in turn, may be configured to communicate with the API components 117. The API components 117 may be communicatively coupled to respective message service providers 106 (e.g., message API component 117$a$ may be communicatively coupled to the message service provider 106$a$, message API component 117$b$ may be communicatively coupled to the message service provider 106$b$, etc.).

In some implementations, the notification system 104 may be accessed, using system UI 107, by one or more user devices 108 for the purposes of configuring and/or managing subscriptions relating to notifications of events generated by one or more applications 102. The user device(s) 108 may be configured to use one or more applications 102 for execution of various tasks, functions, operations, etc. The applications 102 may reside, be installed, and/or operate in enterprise environment that the user devices 108 may have access to. The applications 102 may be network and/or local applications.

The subscriptions may indicate, for example, but not limited to, which events (e.g., critical versus optional updates, security breaches, etc.) generated by applications 102 that the user devices 108 wish to receive notifications of, how often notifications are to be received by the user devices 108, specific user devices 108 (e.g., of a single user and/or multiple users) that should receive particular notifications, specific service providers for transmission of notifications, specific types of channels and/or channels for transmission of notifications, content of notifications, time of transmission of notification, etc. Further, the subscriptions may also provide instructions for delivery of notifications in the event a failure occurs during delivery of one or more notifications (e.g., failure of transmission of a notification using an email notification channel was detected, the system 100 should attempt to use SMS notification channel instead and/or another email notification channel, etc.).

Further, notification subscriptions may also include priority preference(s), whereby delivery channels, providers, etc. may be ranked in a particular order and the system 104 may be instructed to use the priority preferences for transmitting and/or attempting to transmit notifications to user devices 108. Moreover, the system UI 107 may also provide an option to the user to indicate that the system 104 should determine and then select best available channel for transmission of notifications to the user device(s) 108. Alternatively, or in addition, the system 104 may automatically determine and select the best available channel for transmission of notifications. The determination and/or selection may be made within a particular category of channels (e.g., best available email channel, SMS channel, etc.), a particular category of notifications (e.g., urgent notifications (e.g., critical software updates), optional notifications (e.g., optional functionalities of software applications 102)). As stated above, the system 104 may implement various machine learning capabilities that may rely on various analytics, historical data, etc. that may be stored in the database 113 and/or provided by the analytics engine 111. The data may be obtained from the system API 105 as well as APIs 117 (*a, b, . . . n*). The data may include indicators of successful deliveries, failed deliveries, particulars of deliveries (e.g., time it took to deliver a specific notification message by the system 104; transmission rate, costs of transmission, etc.), and/or any other data.

In some implementations, the system UI 107 may be configured to display a list of onboarded software applications 102, i.e., software applications that have been integrated with the system 104 for the purposes of transmitting notification of their events to users. In the system UI 107, navigating to an application's 102 subscription options may provide the user with a list of subscribable events, types of events, etc. and an ability to customize notification delivery methods for each one (e.g., channels, providers, types of messages, types of events, etc.).

When integrating with the notification system 104, each application 102 may be configured to transmit a list of subscribable events (e.g., upgrades, security breaches, etc.) for their users to the system API 105 via the gateway 103 (may be a common gateway for all applications; alternatively, or in addition to, applications 102 may be communicatively coupled to the system 104 using separate gateways 103). The subscribable events may be organized into one or more categories and/or groups which may enable user devices 108 to execute multiple selections of event notifications that the user devices 108 would like to and/or should receive. As stated above, such selections may be made manually and/or automatically via the system UI 107. Each event, for which subscription may be available, may be associated with a unique identifier that may be included in a message request (e.g., as received by the system API 105) from the software application to indicate a subscription category and/or group to be notified.

The information/data relating to subscribable events, software applications associated with subscribable events, which user devices should receive notifications of such events, delivery channels, etc. may be stored in the database 113. The database 113 may store information in various formats, e.g., table format, column-row format, key-value format, etc. (e.g., each key can be indicative of various attributes associated with a specific software application, notification type, user device, delivery channel, provider information, priority of delivery, etc. and each corresponding value can be indicative of attribute's value (e.g., network security application, urgent security breach, a mobile device, email, provider1, highest priority, etc.)). The database 113 may also store various information and/or statistics about each notification message. For example, the database 113 may include a column that may indicate that a message has been successfully delivered and/or failed to deliver. It may also include columns that may store information about time it took to deliver a message, a number of attempts to deliver a message via a particular channel, etc.

In some example, non-limiting implementations, a software application 102 may be configured to generate events of type FAILURE and SUCCESS. Users (e.g., using user devices 108) may subscribe to receive different notifications in the case of each of these events. A user may wish to receive SMS and email notifications for all FAILURE messages, and receive email, SMS, and voice notifications for all SUCCESS messages. The following example codes provide illustrations of these notifications.

For example, user1 is subscribed for event FAILURE notifications for Client-A (e.g., software application 102*a*) via email (e.g., type 1 message transmitted via queue 115*a* and API 117*a*) and voice (e.g., type 2 message transmitted via queue 115*b* and API 117*b*), but not via SMS (e.g., type 3 message transmitted via queue 115*c* and API 117*c*) and push (e.g., type 4 message transmitted via queue 115*d* and API 117*d*):

```
User1 : {
    client_app: "Client-A",
    notification_event: "EVENT_FAILURE",
    email_request : True,
    sms_request : False,
    voice_request: True,
    push_request: False
}
```

By way of another non-limiting example, user2 is subscribed for event FAILURE notifications for Client-A (e.g., software application 102*a*) via email (e.g., type 1 message transmitted via queue 115*a* and API 117*a*), voice (e.g., type 2 message transmitted via queue 115*b* and API 117*b*), SMS (e.g., type 3 message transmitted via queue 115*c* and API 117*c*) and push (e.g., type 4 message transmitted via queue 115*d* and API 117*d*):

```
User2 : {
    client_app: "Client-A",
    notification_event: "EVENT_FAILURE",
    email_request : True,
    sms_request : True,
    voice_request: True,
    push_request: Tue
}
```

The above configurations may be stored in the database 113 and may be accessed by the subscription API 109, which, in turn, may provide information to the system UI 107 for generating, deleting, and/or updating configurations by one or more users. Further, the database 113 may also provide the configuration information the system API 105 that may use it to determine how to route a particular notification message received from one or more software applications 102. Alternatively, or in addition to, the system API 105 may, upon receipt of a particular notification message, query the database 113 to determine routing requirements and/or preferences for that message.

The database 113 may also provide (either automatically (e.g., upon generation of a configuration) and/or in response to a query from the engine 111) the configurations to the analytics engine 111 for analysis. Using the data received from the database 113 and/or one or more APIs 117, the engine 111 (e.g., using machine learning) may generate one or more indicators and/or scores associated with delivery of notification messages to users. For example, the engine 111 may generate a score for each delivery channel based on its history of successful/unsuccessful deliveries of notification messages to one or more users 108. The score may also include score reliability information (e.g., a high score indicative of one successful delivery of a notification message for a particular channel might not be reliable as there is no other data that may support a conclusion that that delivery channel is reliable, etc.). The reliability information may be determined based on data related to prior deliveries of notification messages (e.g., broken down by type of message, type of provider, type of provider channel, transmission rate, timing, etc.) by the system 104.

Once the subscription preferences have been configured using the system UI 107, the system 104 may be configured to initiate processing of notification event messages from one or more software applications 102. To process such messages, the software applications 102 may, for instance, transmit a direct call to the system API 105 via the gateway 103. This option may be used to automate transmission/processing of messages based on real-time events generated by the applications 102. Alternatively, or in addition, software applications 102 may log into the system UI 107, input their notification method, subscription event, message content, etc. and transmit an ad-hoc notification message.

Once a message request is received from the software application(s) at the system API 105, the system API 105 may validate the received message request, obtain any existing subscriptions preferences that may be associated with the software application (that transmitted the message request) for each notification method from the database 113. Then, the system API 105 may generate one or more payloads of the message. The payload(s) may include sender(s) and/or recipient(s) details, information about the message, message identifiers, etc. The payload(s) may be generated using one or more applicable message types contained in the message request.

The following example illustrates a message request that may be generated by one or more software applications 102 for transmission to one or more user devices 108. As shown below, a software application (e.g., "Client-A" application 102a) may generate the following message request and transmit it to the system API 105:

```
{
    client_app: "Client-A",
    notification_event: "EVENT_FAILURE",
    email_request:{
        subject: "This is the email subject",
        body: "This is the email body"
    },
    sms_request:{
        body: "This is the SMS body text"
    },
    voice_request:{
        body: "This is the voice message"
    },
    push_request: null
}
```

In the above request, the requested message is for "EVENT_FAILURE" and is to be transmitted via email (with a subject), SMS, and voice channels, but not a push channel. The system API 105 may validate the above message request and, in some instances, split it into corresponding payloads for each message type (e.g., email, SMS, voice, etc.). Subscriptions to the particular event type (e.g., EVENT_FAILURE) may be queried by the system API 105 from the database 113 and/or automatically provided by the database 113 to determine a list of recipients (e.g., user devices 108) for receiving of the message via a specific channel. As shown above, no push message payload is generated because there was no push_request provided in the message request transmitted by the application 102a. Each resulting payload (for each type of message) is illustrated below:

```
EMAIL MESSAGE PAYLOAD: {
    from: "Client-A",
    type: EMAIL,
    timestamp: 20210505T12
    subject: "This is the email subject",
    body: "This is the email body"
    recipients: ["User1", "User2"]
}
SMS MESSAGE PAYLOAD: {
    from: "Client-A",
    type: SMS,
    timestamp: 20210505T12
    body: "This is the SMS body text"
    recipients: ["User2"]
}
VOICE MESSAGE PAYLOAD: {
    from: "Client-A",
    type: VOICE,
    timestamp: 20210505T12
    body: "This is the voice message"
    recipients: ["User1", "User2"]
}
```

As shown above, a subscription has been setup for the software application 102a (e.g., "Client-A") to transmit an email message notification to two users ("User1" and "User2"). The message may include a timestamp, a subject, and a body of the message. The SMS message is to be transmitted only to "User2" and may include a timestamp and a body of the message. The voice message may be transmitted to the above two users and may include a timestamp and a body of the message. Each payload may be transmitted to respective message queues 115 in accordance with the message type (e.g., email message payload may be transmitted to message queue 115a; voice message payload may be transmitted to message queue 115b, SMS message payload to message queue 115c).

Once received in the message queues 115, the message APIs 117 may then retrieve messages from the respective queues (e.g., email message API 117a may retrieve the email message payload from the queue 115a, voice message API 117b may retrieve the voice message payload from the queue 115b, etc.). The retrieval may be automatic (e.g., the queue may generate a notification to the API that a message is available) and/or upon query from the respective APIs 117.

In some implementations, the analytics engine 111 may be used to determine a particular message service provider 106 for transmission of the messages in the message queues 115. The service providers 106 may be grouped in accordance with a type of messages being transmitted. For example, service providers 106a may be configured to transmit only email messages, while service providers 106b may be configure transmit only SMS messages. There may be more than one service provider within each group of services providers. The engine 111 may be configured to determine which service provider 106 within a particular group of services providers may be more reliable, highly available, etc. for transmission of a particular message. As stated above, the engine 111 may use machine learning that may rely on various data, including, but not limited to, historical data related to transmissions (success, failure, etc.) by each service provider, types of messages being transmitted, software applications transmitting messages, user devices, subscription preferences, provider availability and/or workload, transmission costs, etc. to determine the service provider for transmission of each type of message. Upon selection of a specific service provider 106 (by the engine 111), a particular message may be formatted in accordance with requirements of the selected service provider 106 and provided to the service provider for transmission to the user device 108. The formatting requirements may be provided by the service provider 106 to the system 104 and may be stored in the database 113, whereby the system API 105 may provide such formatting preferences to appropriate APIs 117 prior to providing of the messages to service providers 106.

If the message fails to send, the notification system 104 may be configured to generate an alert indicating that the message has not been sent. It may also store one or more parameters along with corresponding values in the database 113 indicating failure to transmit the message as well as an indication of which message delivery options have been exercised (e.g., attempted_options parameter) and how may have failed. This data may be used to avoid using failed delivery channels/providers for transmission of the same message and/or any future messages.

In some implementations, the engine 111 may be configured to access the data relating to failures and/or successes in transmission of messages by service providers 106 as stored in the database 113. The data may be used to train a machine learning model to generate a score for each service provider 106 along with a score reliability measure which may be used to determine whether a particular service provider 106 is/is not reliable, and/or should/should not be used for any future transmissions. The data may be limited by a particular period of time associated with past message transmissions/failure of message transmissions. This may prevent "turning off" (e.g., not using) a particular service provider 106 because of a single failure to deliver a message. Upon failure of one service provider 106, the analytics engine 111 may be configured to determine the next most optimal service provider for transmission of the message to be tried. This process may repeat until the message is transmitted successfully. In some implementations, the determinations of reliability of a particular service provider 106 may also be valid for a predetermined period of time into the future. The system 104 may be configured to attempt to use a previously failed service provider again after passing of such period of time (e.g., 24 hours). Each success and/or failure by each service provider 106 may be reported by the APIs 117 to the engine 111 for analysis. The reporting may be automatic and/or upon a query from the engine 111.

Figure 2:
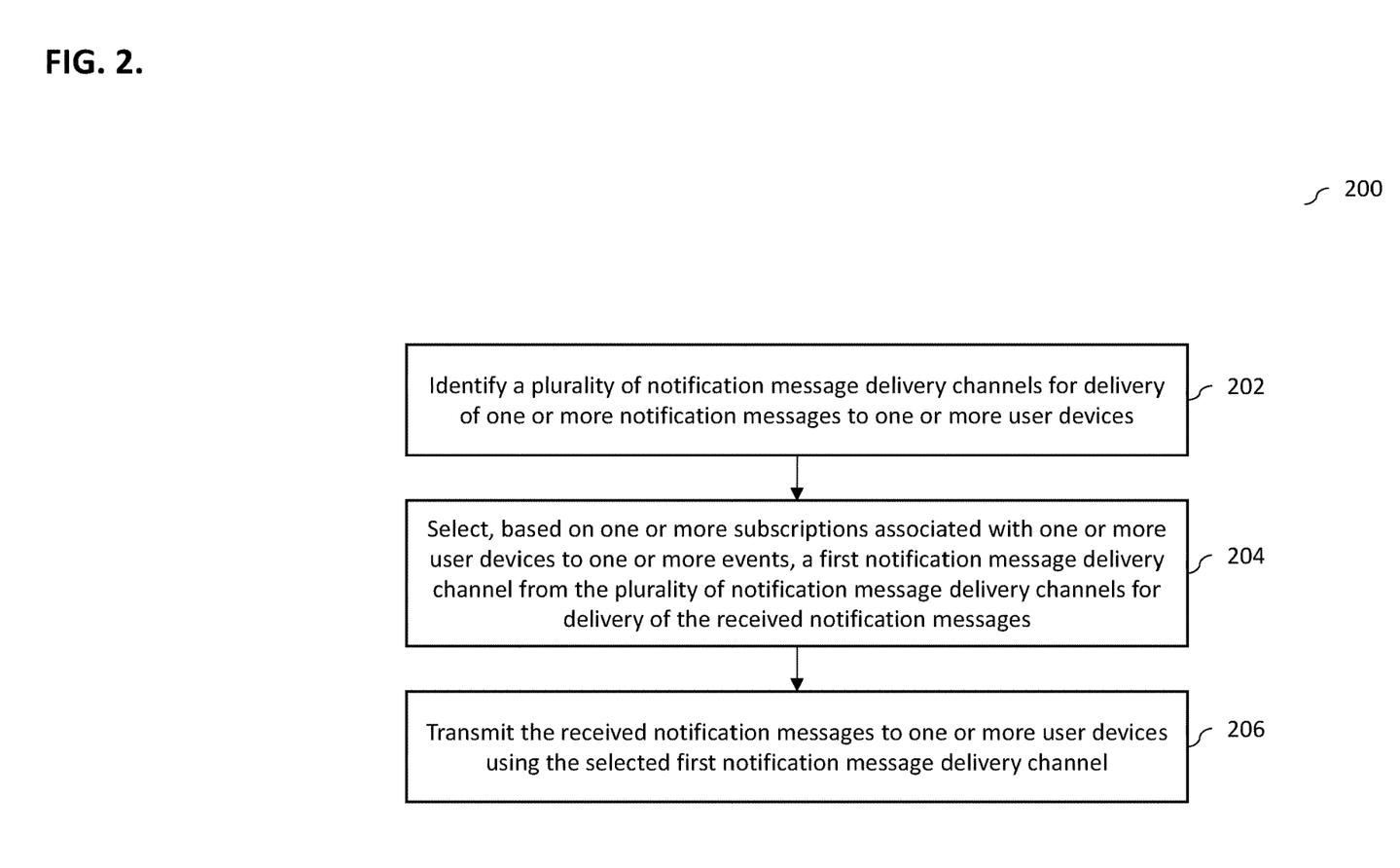
FIG. 2 illustrates an exemplary process for transmission of notification messages, according to some implementations of the current subject matter.

FIG. 2 illustrates an exemplary process 200 for transmission of notification messages, according to some implementations of the current subject matter. The process 200 may be executed by the system 100, and in particular, the notification system 104, as shown in FIG. 1.

At 202, the notification system 104 may be configured to identify a plurality of notification message delivery channels (e.g., provider1/email, provider 1/sms, provider2/voice, etc.) for delivery of one or more notification messages to one or more user devices 108. As stated above, the user devices 108 may be subscribed to receive notifications of events from the software applications 102. The notification messages may correspond to one or more events generated by and/or associated with one or more software applications 102. Various subscription preferences (e.g., type of messages desired, type of channels used for transmission (e.g., email, SMS, voice, push, service providers 106 used, etc.) may be set by one or more user devices 108 using system UI 107.

The subscription preferences may be correlated with a list of subscribable events provided by each software application 102. Such list of subscribable events may be provided during integration of the software application 102 with the system 104. Once integrated, the software applications 102 may transmit one or more messages to the notification system 104 for eventual transmission to one or more user devices 108.

At 204, the notification system 104 may select a specific notification message delivery channel (e.g., provider1/email) to deliver the received message. The channel may be selected from a plurality of notification message delivery channels that may be available and/or identified by the subscription preferences. As stated above, subscriptions may be configured using one or more subscription preferences received from one or more user devices 108. Subscriptions may be based on various factors, e.g., type of message generated by the software application, availability of service providers for transmission of the message, desired transmission frequency of messages, etc.

Once the specific message transmission channel has been identified, the notification system 104 may be configured to execute transmission of the message to one or more user devices 108, at 206. The message may be transmitted using the system API 105 to one or more message queues 115, which in turn, utilize respective message APIs 117 to provide the message to one or more service providers 106. Selection of specific service providers 106 may be based on various analytics associated with transmission of messages, as determined by the analytics engine 111 and discussed above.

In some implementations, selection of a specific message deliver channel may include a determination of a type of the received notification message(s) and selection of the notification message delivery channel based on the subscriptions and the type of the received notification message(s). This may allow the system 104 to select a specific type of channel (e.g., email, SMS, voice, push, etc.) for transmission of a particular message in accordance with subscription preferences. For example, as illustrated above, a message from the software application 102a may be transmitted using email, SMS, and voice, but not push. In some example implementations, the type of the received notification message(s) may include at least one of the following: an email message, a short-message-service (SMS) message, an audio message, a video message, a text message, a voice message, a push notification message, and any combination thereof.

In some implementations, each type (in the plurality of types) of the received notification message(s) may be associated with one or more notification message delivery channels in the plurality of notification message delivery channels. The channels may be provided by the respective service providers 106, whereby the service providers 106 may receive the messages from the respective message APIs 117, which in turn, retrieve such messages from the respective message queues 115, as shown in FIG. 1.

In some implementations, upon determining a failure to deliver the received notification message(s) using the selected notification message delivery channel, the notification system 104 may be configured to identify and/or select another notification message delivery channel (e.g., select another email service provider 106 for transmission of the notification message upon determining that the previously selected email service provider failed to deliver the message). The identification/selection of such other service provider may be based on one or more subscriptions and the type of the received notification message(s). Once such other service provider 106 is selected, the system 104 may be configured to transmit the received notification message(s) using the selected notification message delivery channel.

In some implementations, the subscription preferences received from one or more user devices 108 may be configured using a list of subscribable events associated with the software application(s) 102. This process may be handled using system UI 107, whereby users may log into the system 104 using the system UI 107 and identify applications 102 that they would like to receive notifications from. The system 104 may then retrieve a list of subscribable events for each identified application 102 and allow the user to select specific (and/or all, none, etc.) events for which they would like to receive notifications. Alternatively, or in addition to, the system 104 may automatically select events for which users (e.g., specific users (e.g., system administrators, etc.)) may receive notifications. Once subscription preferences are finalized, they may be stored in the database 113 and may be accessible by the system API 105 and/or the analytics engine 111 upon receipt of future messages.

Selection of channels may include selection of a notification message delivery channel for delivery of the received notification message(s) based on one or more subscriptions and a content of the received notification message(s). In some implementations, the system 104 may be configured to analyze content of the receive message and determine how to route that message. This may be helpful in instances where subscription preferences have not been specifically set for a particular message (e.g., newly received) and, thus, analysis of the message may reveal how (e.g., which service provider, what type of service provider, etc.) the message should be routed.

In some implementations, selection of channels may also include extraction of a subscription identifier associated with the received notification message(s) and selection of the notification message delivery channel for delivery of the received notification message(s) based on the subscriptions and the extracted subscription identifier. The subscription identifier may identify at least one of the following: one or more user devices 108, one or more events generated by the software application(s) 102, one or more software applications 102, one or more subscription preferences, and any combination thereof.

In some implementations, the system 104, and in particular, the engine 111 may be configured to generate one or more scores for each notification message delivery channel (e.g., a service provider selected for transmission of a specific message) in accordance with at least one of: a successful delivery of the received notification message(s), a failed delivery of the received notification message(s), and any combination thereof. In some implementations, selection of the message delivery channel for delivery of the received notification message(s) may be based on one or more subscriptions and one or more generated scores. Further, successful delivery of the received notification message(s) may be determined based on an acknowledgement received from one or more user devices 108 (to which the message(s) were transmitted). A failed delivery of the received notification message(s) may be determined based on a failure to receive an acknowledgement from one or more user devices 108 (to which the message(s) were transmitted). As stated above, each notification message delivery channel may be associated with one or more service providers 106 configured for delivery of the received notification message(s) (e.g., service provider(s) 106a may be configured for delivery of email messages, service provider(s) 106b may be configured for delivery of SMS messages, etc.). In some implementations, the generated scores may be stored in a storage location (e.g., database 113).

Figure 3:
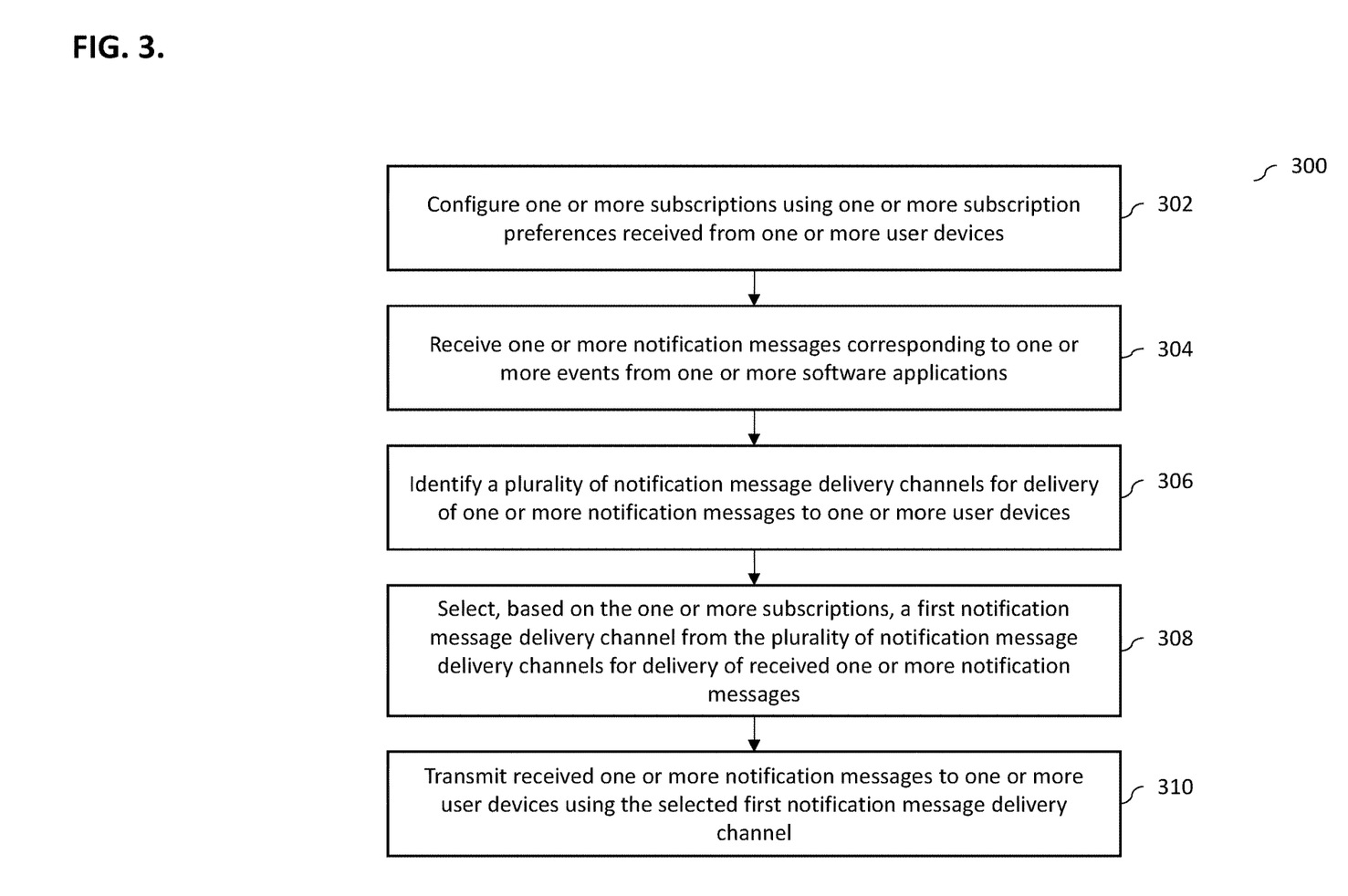
FIG. 3 illustrates another exemplary process for transmission of notification messages, according to some implementations of the current subject matter.

FIG. 3 illustrates another exemplary process 300 for transmission of notification messages, according to some implementations of the current subject matter. The process 300 may be executed by the system 100, and in particular, the notification system 104, as shown in FIG. 1.

At 302, the notification system 104 may configure one or more subscriptions for delivery of notification messages associated with one or more events generated by one or more software applications 102 using one or more subscription preferences received from one or more user devices 108. The subscriptions may be associated with one or more events associated with one or more software applications. The configuration of subscriptions may be executed using system UI 107 based on a list of subscribable events from each application 102 that has been integrated with the system 104 as well as subscription preferences of users associated one or more user devices 108.

At 304, one or more notification messages corresponding to one or more events may be received from the software application(s). The messages may be received by the system API 105 via the gateway 103 (for instance), as shown in FIG. 1. At 306, a plurality of notification message delivery channels (e.g., corresponding to one or more service providers 106) for delivery of the notification message(s) to the one or more user devices may be identified by the system 104. The system API 105 may use information obtained from the database 113 (that may store subscription information discussed above) as well as analytics from the analytics engine 111.

At 308, the system 104 may select a first notification message delivery channel (e.g., an email service provider 106a) from the plurality of notification message delivery channels for delivery of the received notification message(s). Again, selection of channels may be based on various factors, such as preferences, availability of service providers 106, type of message, type of channel (e.g., email, SMS, etc.), and/or any other factors. Once the channel (e.g., first notification message delivery channel) is selected, the system 104 may execute transmission of the notification message(s) to one or more user devices 108 using that channel. The selected notification message delivery channel may be selected based on one or more subscriptions and a type of the received notification message(s). As stated above, the type of the received notification message(s) may include at least one of the following: an email message, a short-message-service (SMS) message, an audio message, a video message, a text message, a voice message, a push notification message, and any combination thereof. Further, the type of the received notification message(s) may be associated with one or more notification message delivery channels in the plurality of notification message delivery channels.

In some implementations, the notification system 104 may be configured to determine a failure to deliver the received notification message(s) using the selected notification message delivery channel. For example, one or more user device to which the message was sent did not respond with an acknowledgement of the received message, thereby causing the system 104 to determine that a delivery failure may have occurred. In that case, the system 104 may select another notification message delivery channel (e.g., another emails service provider 106 and/or another type (e.g., SMS) of service provider 106) based on one or more subscriptions and the type of the received notification message(s) and transmit the notification message(s) using the newly selected channel.

Figure 4:
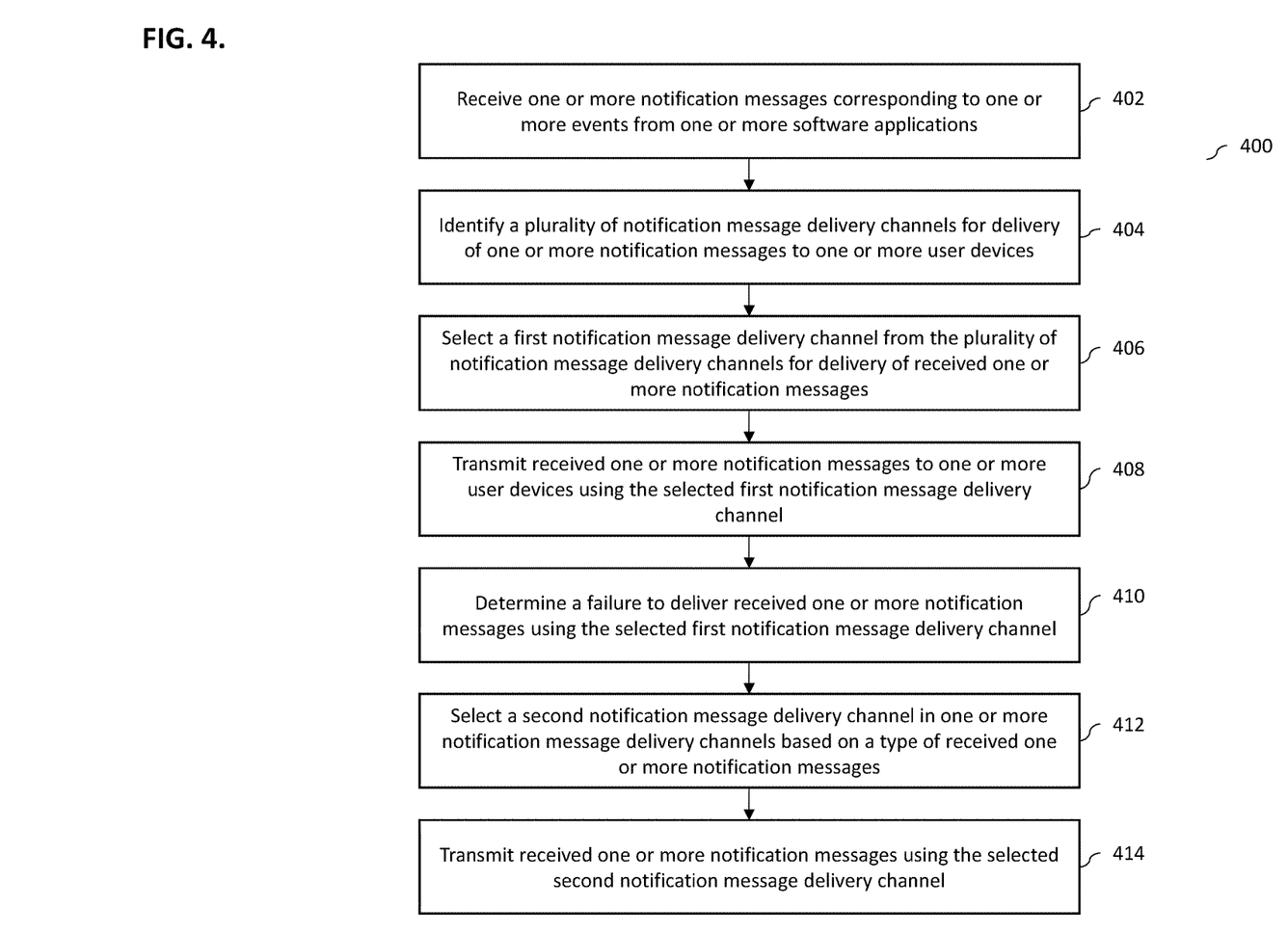
FIG. 4 illustrates yet another exemplary process for transmission of notification messages, according to some implementations of the current subject matter.

FIG. 4 illustrates yet another exemplary process 400 for transmission of notification messages, according to some implementations of the current subject matter. The process 400 may be executed by the system 100, and in particular, the notification system 104, as shown in FIG. 1.

At 402, the notification system 104 may be configured to receive one or more notification messages corresponding to one or more events from one or more software applications 102. As stated above, the messages may be received by the system API 105.

At 404, the system 104 may identify a plurality of notification message delivery channels for delivery of the notification message(s) to one or more user devices 108. The identification of channels (e.g., service providers 106) may be based on various subscription preferences that may be generated as a result of users' interactions with the system UI 107, whereby users may select (e.g., manually, automatically, etc.) one or more subscribable events from lists of subscribable events associated with software applications 102 for notification purposes. The users may also identify specific preferences associated with delivery of messages, such as, for example, type of channels used (e.g., email, SMS, etc.), frequency of notifications (e.g., daily, weekly, based on urgency, etc.), etc.

At 406, the system 104 may select a first notification message delivery channel (e.g., an email service provider 106a) from the plurality of notification message delivery channels for delivery of the received notification message(s) and transmit the received notification message(s) to one or more user devices 108 using the selected first notification message delivery channel, at 408.

At 410, the system 104 may determine a failure to deliver the received notification message(s) using the selected first notification message delivery channel. For example, the system 104 may determine that an acknowledgement of a receipt of the transmitted message has not been received by the system 104 within a preset period of time (e.g., 3 seconds). In that case, the system 104 may then select another or second notification message delivery channel based on a type (e.g., email, SMS, etc.) of the received notification message(s), at 412, and transmit the received message using the newly selected channel, at 414.

Figure 5:
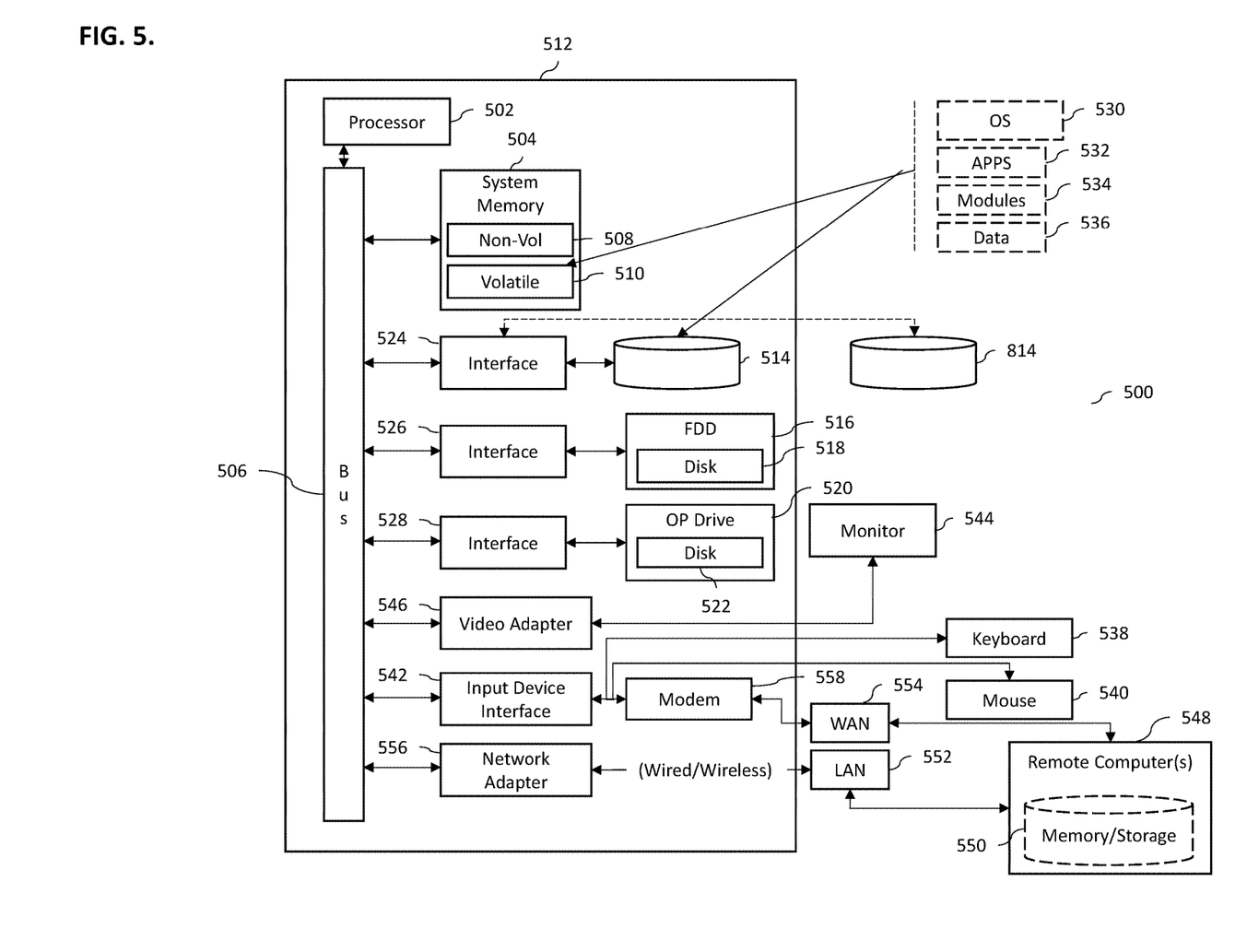
FIG. 5 illustrates an exemplary computer architecture, according to some implementations of the current subject matter.

FIG. 5 illustrates an embodiment of an exemplary computer architecture 500 suitable for implementing various embodiments as previously described. In some implementations, the computer architecture 500 may include or be implemented as part of computing architecture 100 shown in FIG. 1. In some implementations, the computing system 500 may be representative, for example, of the notification system 104, the software applications 102, service providers 106, and/or user devices 108. As can be understood, these implementations are not limited in this context. More generally, the computing architecture 500 may be configured to implement all logic, applications, systems, methods, apparatuses, and functionality described herein with reference to FIGS. 1-4 above.

As used in this application, the terms "system" and "component" are intended to refer to a computer-related entity, either hardware, a combination of hardware and software, software, or software in execution, examples of which are provided by the exemplary computing computer architecture 500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computer architecture 500 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing computer architecture 500.

As shown in FIG. 5, the computer architecture 500 includes a computer 512 comprising a processor 502, a system memory 504 and a system bus 506. The processor 502 can be any of various commercially available processors. The computer 512 may be representative of the notification system 104, the software applications 102, service providers 106, and/or user devices 108.

The system bus 506 provides an interface for system components including, but not limited to, the system memory 504 to the processor 502. The system bus 506 can be any of several types of bus structure that may further interconnect to a memory bus (with or without a memory controller), a peripheral bus, and a local bus using any of a variety of commercially available bus architectures. Interface adapters may connect to the system bus 506 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computer architecture 500 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 504 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 5, the system memory 504 can include non-volatile 508 and/or volatile 510. A basic input/output system (BIOS) can be stored in the non-volatile 508.

The computer 512 may include various types of computer-readable storage media in the form of one or more lower speed memory units, including an internal (or external) hard disk drive 514, a magnetic disk drive 516 to read from or write to a removable magnetic disk 518, and an optical disk drive 520 to read from or write to a removable optical disk 522 (e.g., a CD-ROM or DVD). The hard disk drive 514, magnetic disk drive 516 and optical disk drive 520 can be connected to the system bus 506 by an HDD interface 524, and FDD interface 526 and an optical disk drive interface 528, respectively. The HDD interface 524 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and non-volatile 508, and volatile 510, including an operating system 530, one or more applications 532, other program modules 534, and program data 536. In one embodiment, the one or more applications 532, other program modules 534, and program data 536 can include, for example, the various applications and/or components of the system 100.

A user can enter commands and information into the computer 512 through one or more wire/wireless input devices, for example, a keyboard 538 and a pointing device, such as a mouse 540. Other input devices may include microphones, infra-red (IR) remote controls, radio-frequency (RF) remote controls, game pads, stylus pens, card readers, dongles, fingerprint readers, gloves, graphics tablets, joysticks, keyboards, retina readers, touch screens (e.g., capacitive, resistive, etc.), trackballs, track pads, sensors, styluses, and the like. These and other input devices are often connected to the processor 502 through an input device interface 542 that is coupled to the system bus 506 but can be connected by other interfaces such as a parallel port, IEEE 1394 serial port, a game port, a USB port, an IR interface, and so forth.

A monitor 544 or other type of display device is also connected to the system bus 506 via an interface, such as a video adapter 546. The monitor 544 may be internal or external to the computer 512. In addition to the monitor 544, a computer typically includes other peripheral output devices, such as speakers, printers, and so forth.

The computer 512 may operate in a networked environment using logical connections via wire and/or wireless communications to one or more remote computers, such as a remote computer(s) 548. The remote computer(s) 548 can be a workstation, a server computer, a router, a personal computer, portable computer, microprocessor-based entertainment appliance, a peer device or other common network node, and typically includes many or all the elements described relative to the computer 512, although, for purposes of brevity, only a memory and/or storage device 550 is illustrated. The logical connections depicted include wire/wireless connectivity to a local area network 552 and/or larger networks, for example, a wide area network 554. Such LAN and WAN networking environments are commonplace in offices and companies, and facilitate enterprise-wide computer networks, such as intranets, all of which may connect to a global communications network, for example, the Internet.

When used in a local area network 552 networking environment, the computer 512 is connected to the local area network 552 through a wire and/or wireless communication network interface or network adapter 556. The network adapter 556 can facilitate wire and/or wireless communications to the local area network 552, which may also include a wireless access point disposed thereon for communicating with the wireless functionality of the network adapter 556.

When used in a wide area network 554 networking environment, the computer 512 can include a modem 558, or is connected to a communications server on the wide area network 554 or has other means for establishing communications over the wide area network 554, such as by way of the Internet. The modem 558, which can be internal or external and a wire and/or wireless device, connects to the system bus 506 via the input device interface 542. In a networked environment, program modules depicted relative to the computer 512, or portions thereof, can be stored in the remote memory and/or storage device 550. It will be appreciated that the network connections shown are exemplary and other means of establishing a communications link between the computers can be used.

The computer 512 is operable to communicate with wire and wireless devices or entities using the IEEE 502 family of standards, such as wireless devices operatively disposed in wireless communication (e.g., IEEE 502.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 502.11 (a, b, g, n, ac, ax, etc.) to provide secure, reliable, fast wireless connectivity. A Wi-Fi network can be used to connect computers to each other, to the Internet, and to wire networks (which use IEEE 502.3-related media and functions).

The various elements of the devices as previously described with reference to FIGS. 1-4 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores", may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

What is claimed:

1. A computer-implemented method, comprising:
    identifying, using at least one processor, a plurality of notification message delivery channels for delivery of one or more notification messages to one or more user devices, the one or more notification messages being received from one or more software applications and corresponding to one or more events associated with the one or more software applications;
    selecting, using the at least one processor, based on one or more subscriptions associated with the one or more user devices to the one or more events and a history of at least one of: successful and unsuccessful deliveries of one or more prior notification messages using each of the plurality of notification message delivery channels, a first notification message delivery channel from the plurality of notification message delivery channels for delivery of the received one or more notification messages, the one or more subscriptions being configured using one or more subscription preferences received from the one or more user devices, the first notification message delivery channel has a first message delivery reliability score associated with a delivery of at least one notification message in the one or more notification messages, wherein the first message delivery reliability score is greater than at least another message delivery reliability score of at least another notification message delivery channel in the plurality of notification message delivery channels; and
    transmitting, using the at least one processor, the received one or more notification messages to the one or more user devices using the selected first notification message delivery channel.

2. The method according to claim 1, wherein the selecting including
    determining a type in a plurality of types of the received one or more notification messages; and
    selecting the first notification message delivery channel based on the one or more subscriptions and the type of the received one or more notification messages.

3. The method according to claim 2, wherein the type of the received one or more notification messages includes at least one of the following: an email message, a short-message service (SMS) message, an audio message, a video message, a text message, a voice message, a push notification message, and any combination thereof.

4. The method according to claim 2, wherein each type in the plurality of types is associated with one or more notification message delivery channels in the plurality of notification message delivery channels.

5. The method according to claim 4, further comprising
    determining, using the at least one processor, a failure to deliver the received one or more notification messages using the selected first notification message delivery channel;
    selecting, using the at least one processor, a second notification message delivery channel in the one or more notification message delivery channels based on the one or more subscriptions and the type of the received one or more notification messages; and
    transmitting, using the at least one processor, the received one or more notification messages using the selected second notification message delivery channel.

6. The method according to claim 1, wherein the one or more subscription preferences received from the one or more user devices is configured using a list of subscribable events associated with the one or more software applications.

7. The method according to claim 1, wherein the selecting includes
    selecting the first notification message delivery channel for delivery of the received one or more notification messages based on the one or more subscriptions and a content of the received one or more notification messages.

8. The method according to claim 1, wherein the selecting includes
    extracting, using the at least one processor, a subscription identifier associated with the received one or more notification messages;
    selecting the first notification message delivery channel for delivery of the received one or more notification messages based on the one or more subscriptions and the extracted subscription identifier.

9. The method according to claim 8, wherein the subscription identifier identifies at least one of the following: the one or more user devices, the one or more events, the one or more software applications, the one or more subscription preferences, and any combination thereof.

10. The method according to claim 1, further comprising
    generating, using the at least one processor, one or more scores for each notification message delivery channel in the plurality of notification message delivery channels in accordance with at least one of: a successful delivery of the received one or more notification messages, a failed delivery of the received one or more notification messages, and any combination thereof.

11. The method according to claim 10, wherein the selecting includes
    selecting the first notification message delivery channel for delivery of the received one or more notification messages based on the one or more subscriptions and the one or more generated scores.

12. The method according to claim 10, wherein
    the successful delivery of the received one or more notification messages is determined based on an acknowledgement received from the one or more user devices; and
    the failed delivery of the received one or more notification messages is determined based on a failure to receive an acknowledgement from the one or more user devices.

13. The method according to claim 10, wherein each notification message delivery channel in the plurality of notification message delivery channels is associated with one or more service providers in a plurality of service providers configured for delivery of the received one or more notification messages.

14. The method according to claim 10, further comprising storing, using the at least one processor, the generated one or more scores in a storage location.

15. An apparatus, comprising:
- at least one processor; and
- at least one non-transitory storage media storing instructions that, when executed by the at least one processor, cause the at least one processor to perform operations comprising:
  - configuring one or more subscriptions using one or more subscription preferences received from one or more user devices, the one or more subscriptions being associated with one or more events associated with one or more software applications;
  - receiving one or more notification messages corresponding to the one or more events from the one or more software applications;
  - identifying a plurality of notification message delivery channels for delivery of the one or more notification messages to the one or more user devices;
  - selecting, based on the one or more subscriptions and a history of at least one of: successful and unsuccessful deliveries of one or more prior notification messages using each of the plurality of notification message delivery channels, a first notification message delivery channel from the plurality of notification message delivery channels for delivery of the received one or more notification messages, the first notification message delivery channel has a first message delivery reliability score associated with a delivery of at least one notification message in the one or more notification messages, wherein the first message delivery reliability score is greater than at least another message delivery reliability score of at least another notification message delivery channel in the plurality of notification message delivery channels; and
  - transmitting the received one or more notification messages to the one or more user devices using the selected first notification message delivery channel.

16. The apparatus according to claim 15, wherein the first notification message delivery channel is selected based on the one or more subscriptions and a type of the received one or more notification messages.

17. The apparatus according to claim 16, wherein the type of the received one or more notification messages includes at least one of the following: an email message, a short-message service (SMS) message, an audio message, a video message, a text message, a voice message, a push notification message, and any combination thereof.

18. The apparatus according to claim 16, wherein the type of the received one or more notification messages is associated with one or more notification message delivery channels in the plurality of notification message delivery channels.

19. The apparatus according to claim 16, wherein the operations further comprise determining a failure to deliver the received one or more notification messages using the selected first notification message delivery channel;
- selecting a second notification message delivery channel in the one or more notification message delivery channels based on the one or more subscriptions and the type of the received one or more notification messages; and
- transmitting the received one or more notification messages using the selected second notification message delivery channel.

20. At least one non-transitory storage media storing instructions that, when executed by at least one processor, cause the at least one processor to perform operations comprising:
- receiving one or more notification messages corresponding to one or more events from one or more software applications;
- identifying a plurality of notification message delivery channels for delivery of the one or more notification messages to one or more user devices;
- selecting, based on and a history of at least one of: successful and unsuccessful deliveries of one or more prior notification messages using each of the plurality of notification message delivery channels, a first notification message delivery channel from the plurality of notification message delivery channels for delivery of the received one or more notification messages, the first notification message delivery channel has a first message delivery reliability score associated with a delivery of at least one notification message in the one or more notification messages, wherein the first message delivery reliability score is greater than at least another message delivery reliability score of at least another notification message delivery channel in the plurality of notification message delivery channels;
- transmitting the received one or more notification messages to the one or more user devices using the selected first notification message delivery channel;
- determining a failure to deliver the received one or more notification messages using the selected first notification message delivery channel;
- selecting a second notification message delivery channel in the one or more notification message delivery channels based on a type of the received one or more notification messages; and
- transmitting the received one or more notification messages using the selected second notification message delivery channel.

\* \* \* \* \*